US006651808B2

(12) United States Patent
Nguyen et al.

(10) Patent No.: US 6,651,808 B2
(45) Date of Patent: Nov. 25, 2003

(54) BELT DRIVEN ROLLER CONVEYOR

(75) Inventors: Thanh V Nguyen, Wyoming, MI (US); Dennis J Schuitema, Ada, MI (US)

(73) Assignee: Rapistan Systems Advertising Corp., Grand Rapids, MI (US)

( * ) Notice: Subject to any disclaimer, the term of this patent is extended or adjusted under 35 U.S.C. 154(b) by 0 days.

(21) Appl. No.: 10/150,047

(22) Filed: May 17, 2002

(65) Prior Publication Data

US 2002/0134649 A1 Sep. 26, 2002

Related U.S. Application Data

(62) Division of application No. 09/433,325, filed on Nov. 3, 1999, now Pat. No. 6,390,286.
(60) Provisional application No. 60/115,146, filed on Jan. 8, 1999.

(51) Int. Cl.[7] ............................................... B65G 13/06
(52) U.S. Cl. .......................... 198/781.08; 198/781.03; 198/781.09
(58) Field of Search ...................... 198/781.03, 781.08, 198/781.09, 781.1, 790

(56) References Cited

U.S. PATENT DOCUMENTS

| | | | |
|---|---|---|---|
| 2,190,418 A | 2/1940 | Daidson et al. ................ | 271/52 |
| 3,416,638 A | 12/1968 | Buck ............................ | 193/37 |
| 3,451,527 A | 6/1969 | Leach ..................... | 198/781.03 |
| 3,939,962 A | 2/1976 | Gebhardt ................ | 198/781.08 |
| 4,028,956 A | 6/1977 | Thompson .................... | 74/236 |
| 4,096,942 A | 6/1978 | Shepherd ..................... | 198/781 |
| 4,238,029 A * | 12/1980 | Pirro, Jr. ............. | 198/781.08 X |
| 4,278,166 A | 7/1981 | Pirro, Jr. ...................... | 198/781 |
| 4,301,914 A | 11/1981 | Krammer ................ | 198/781.08 |
| 4,308,946 A | 1/1982 | Ouellette ..................... | 198/790 |
| 4,353,458 A | 10/1982 | Saur ............................ | 198/781 |
| 4,361,224 A | 11/1982 | Bowman ..................... | 198/781 |
| 4,441,607 A | 4/1984 | Bowman et al. ............. | 198/781 |
| 4,458,809 A | 7/1984 | White et al. ................. | 198/790 |
| 4,473,148 A * | 9/1984 | Saur ....................... | 198/781.09 |
| 4,562,921 A | 1/1986 | Leemkuil et al. ........... | 198/841 |
| 4,729,575 A | 3/1988 | Cataldo ....................... | 474/242 |
| 4,753,339 A | 6/1988 | Vogt et al. .............. | 198/781.03 |
| 4,832,184 A * | 5/1989 | DeGood ................. | 198/781.03 |
| 4,919,256 A | 4/1990 | Gebhardt ............... | 198/781.08 |
| 5,191,967 A | 3/1993 | Woltjer et al. .............. | 198/781 |
| 5,531,311 A | 7/1996 | LeMay et al. ............... | 198/448 |
| 5,826,702 A | 10/1998 | Gibson et al. .............. | 198/790 |
| 5,964,338 A | 10/1999 | Schroader .................... | 198/782 |
| 6,390,286 B1 * | 5/2002 | Nguyen et al. ......... | 198/781.08 |

FOREIGN PATENT DOCUMENTS

| | | | | |
|---|---|---|---|---|
| DE | 2806640 | * | 8/1978 | ............ 198/781.09 |
| DE | 3620740 | | 1/1987 | ............ 198/781.08 |

* cited by examiner

Primary Examiner—James R. Bidwell
(74) Attorney, Agent, or Firm—Van Dyke, Gardner, Linn & Burkhart, LLP

(57) ABSTRACT

A roller conveyor belt driver system for a roller conveyor includes a closed loop belt having a continuous driving surface and a non-circular base and a plurality of pulleys which support and engage said non-circular base for at least partially laterally restraining the belt from rotation. A first group of pulleys are constructed and arranged to position the belt in non-orthogonal orientation with respect to the rollers of the conveyor for contacting one or more rollers with the driving surface of the belt. Optionally, the belt driver system includes a lateral restraint associated with a respective pulley of the first group of pulleys to urge the belt to remain engaged with the respective pulley to prevent twisting of the belt and, therefore, increase the life of the belt. For example, the lateral restraint may comprise a bearing which is positioned adjacent the respective pulley and which contacts the belt to maintain the belt in proper orientation in the pulley. In one form, the belt comprises a link belt, which is formed from a plurality of interlocking links, which permits the belt to be easily removed for service or replacement.

26 Claims, 15 Drawing Sheets

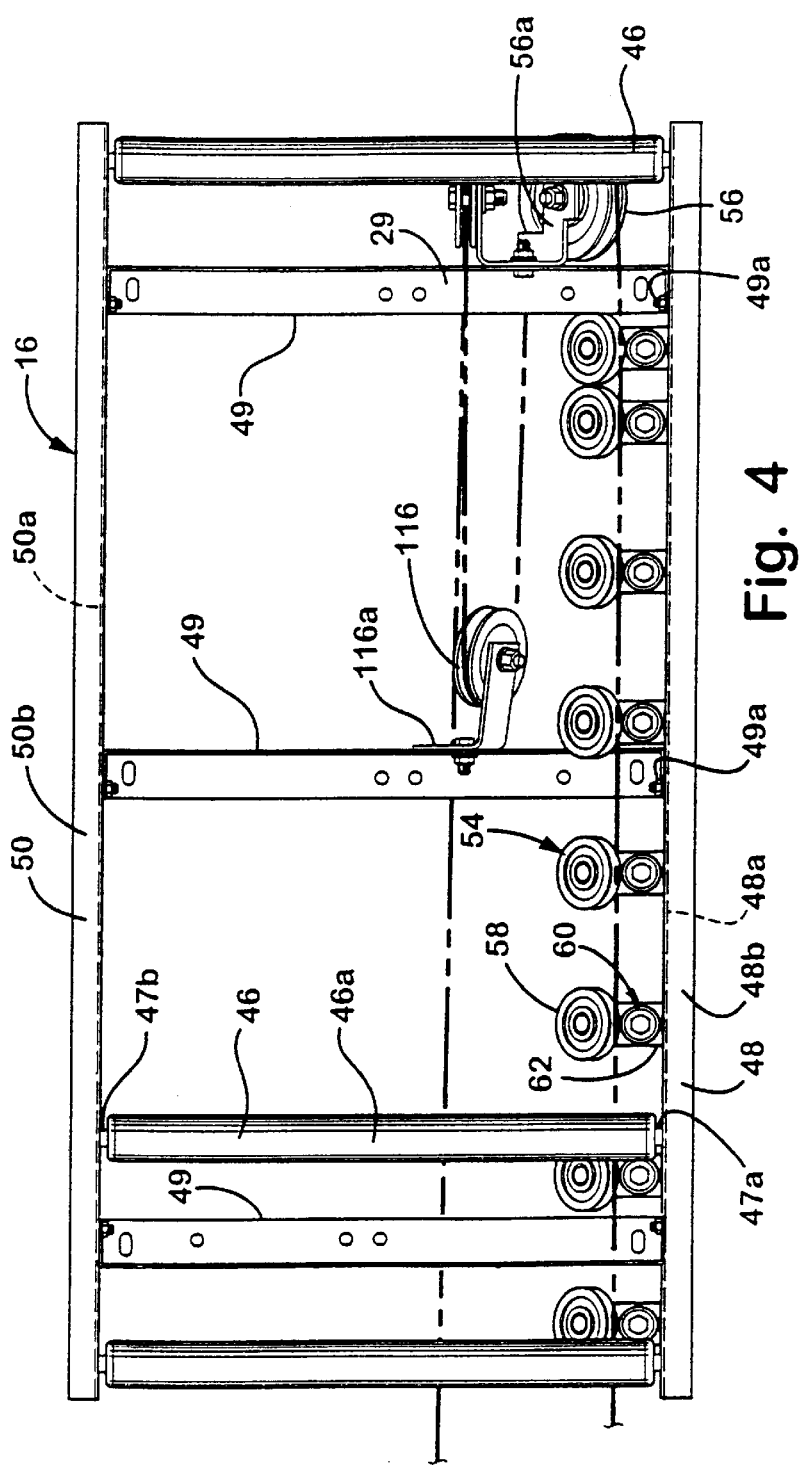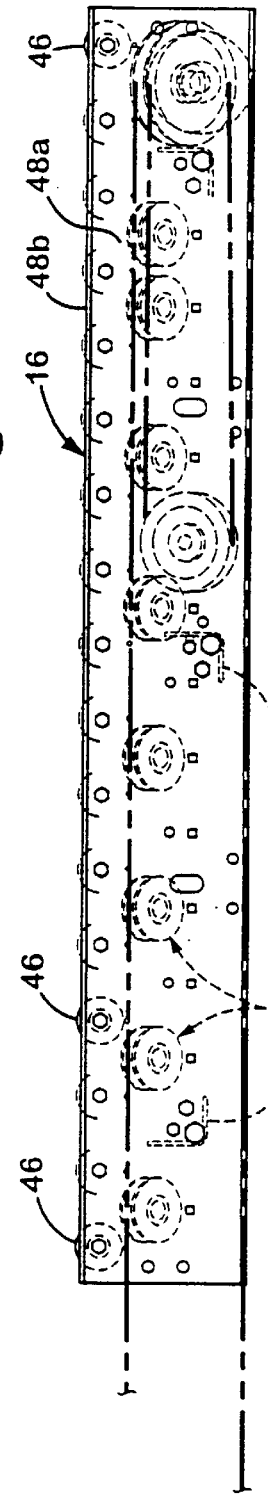

BELT DRIVEN ROLLER CONVEYOR

This application is a divisional application of pending U.S. patent application Ser. No. 09/433,325, filed Nov. 3, 1999, now U.S. Pat. No. 6,390,286 entitled BELT DRIVEN ROLLER CONVEYOR, which claims priority from pending provisional application, Serial No. 60/115,146, entitled BELT DRIVEN ROLLER CONVEYOR, filed Jan. 8, 1999, which are hereby incorporated herein by reference in their entireties.

TECHNICAL FIELD AND BACKGROUND OF THE INVENTION

The present invention relates to a conveyor and more particularly to a belt driven roller conveyor. The invention can be used with straight or curved roller conveyors.

Conventional roller conveyors are often belt driven either by a plurality of intermediate O-ring belts associated with each of the respective rollers or a single continuous closed loop direct drive belt which extends over a discrete length of the conveyor section. Heretofore, one type of closed loop drive belt that has been used on roller curves had a round cross-section comprising a rubber-covered cord. The round closed loop belts, however, are limited in length. Consequently, the belt drive system configuration is dictated by the available lengths of the belts. Furthermore, because of their geometry, as the round or circular belts are driven in their closed loop, the round belts may twist which over time may cause the belt cords to break. Moreover, due to the conventional configurations of the round belt driven systems, replacement of these belts requires partial disassembly of the conveyor. As a result, the conveyor is removed from production creating "down-times". Replacement of these belts, therefore, may impose a significant cost on the user of the conveyor.

In an attempt to reduce the strain on the round closed loop belts, intermediate O-ring drivers have been implemented. The intermediate O-ring drivers drive the rollers with the O-ring drivers being driven by the round belt. However, the round belts still may exhibit short life spans. More recent attempts to solve this problem have been to use link belts instead of continuous round rubber covered cord belts. Replacement of the link belts requires no disassembly of the conveyor per se and, as a result, is relatively quick and simple compared to the continuous round belts. Furthermore, it is suggested that the link belts may have a higher mean time between failures than continuous belts because they use a different internal structure. However, use of link belts has not been without difficulties. The link belts have either a substantially round cross-section or a generally triangular cross-section. Both shapes, however, have an undulating drive surface. The triangular cross-sectioned link belt includes a V-shaped base, with the upper surface comprising the driving surface of the belt. The triangular cross-sectioned belts are driven by V-shaped pulleys which provide lateral restraints on the belt and prevent twisting of the belt. However, the link belt driven systems exhibit significantly increased noise due to the vibration of the belt and other components as the belt's undulating surface contacts the rollers. The circular cross-section has a non-uniform circumference when certain portions of the belt are in contact with the rollers. The noise can be extreme.

Consequently, there is a need for a belt drive system for a roller conveyor which is relatively simple to service or replace and which exhibits an increased life expectancy without the increased noise associated with the conventional link belts.

SUMMARY OF THE INVENTION

The present invention provides a belt driver system for a roller conveyor which exhibits a longer life span than conventional round driver belts and, yet, does not exhibit the increased noise associated with conventional link belts.

According to one form of the invention, a belt for driving one or more rollers on a roller conveyor includes a body having a base and a substantially continuous driving surface for driving the rollers. The base has a non-circular cross-section so that pulleys which support and guide the belt can laterally restrain the belt and minimize twisting of the belt.

In one aspect, the base comprises a generally V-shaped base. In other aspects, the belt comprises a link belt, which is formed by a plurality of interlocking links. The link belt preferably includes tapered portions which are substantially aligned to provide the substantially continuous linear driving surface.

In yet other aspects, the belt includes an axis of symmetry with the driving surface being offset from the axis of symmetry. Preferably, the driving edge is offset from the axis of symmetry by an angle from a range of 55 to 65 degrees.

In another form of the invention, a belt driver system includes a closed loop belt having a non-circular base and a substantially continuous driving surface for driving the rollers of a conveyor. The belt driver system further includes a plurality of pulleys which support the belt and which are constructed and arranged to position and maintain the belt in an orientation in the pulleys. A first group of the pulleys position the belt for contacting the one or more rollers with the driving surface.

In one aspect, at least one of the first group of pulleys includes a lateral restraint for maintaining the belt in the proper orientation in the at least one pulley. The lateral restraint may for example comprise a bearing which is supported adjacent the at least one pulley and which contacts a portion of the driving portion of the belt. In other aspects, one of pulleys comprises a tensioner pulley for maintaining the tension of the belt.

In other forms, the base of the closed loop belt comprises a V-shaped base, with each of the pulleys supporting the belt in a groove commensurate in size with the V-shaped base thereby providing lateral support to the belt.

In yet another form of the invention, a conveyor includes a support frame, a plurality of rollers rotatably supported on the support frame, and a belt driver system. The belt driver system includes a closed loop belt and a plurality of pulleys for supporting and guiding the belt around a closed path on the conveyor. The belt includes a substantially continuous driving surface for driving the rollers. A first group of the pulleys comprises support pulley assemblies, which are angled in a non-orthogonal orientation to the rollers for orienting the belt to engage the rollers with the driving surface. Further, one of the pulleys comprises a slave drive pulley which is constructed and arranged for driving an adjacent conveyor section.

In one aspect, each of the support pulleys includes a bearing which provide lateral restraint for the belt.

In other aspects, the support pulleys are mounted to the frame by spring mounting members which minimize the pressure from the belt on the rollers to reduce wear and tear on the rollers. This also provides for consistent pressure even if there is a variation such as in belt thickness.

In yet another aspect, the frame includes an inner radius frame member and an outer radius frame member forming a curved conveyor section. A first group of the rollers comprising tapered rollers having smaller diameters at the inner radius frame than at the outer radius frame member. The belt is positioned adjacent the inner radius frame member for engaging the smaller diameters of said tapered rollers such that the curved conveyor speed at the small end of the roller is the same as adjacent conveyor sections with straight rollers.

The improved belt and belt driver system provides for increased life of the belt while reducing the noise associated with link belts. These and other advantages will be appreciated from a review of the description of the preferred embodiments in conjunction with the drawings which follow.

DETAILED DESCRIPTION OF THE DRAWINGS

FIG. 4 is a plan view of a junction conveyor section of the conveyor of FIG. 1;

FIG. 5 is a side view of the junction conveyor section of FIG. 4;

BRIEF DESCRIPTION OF THE PREFERRED EMBODIMENTS

Figure 1:
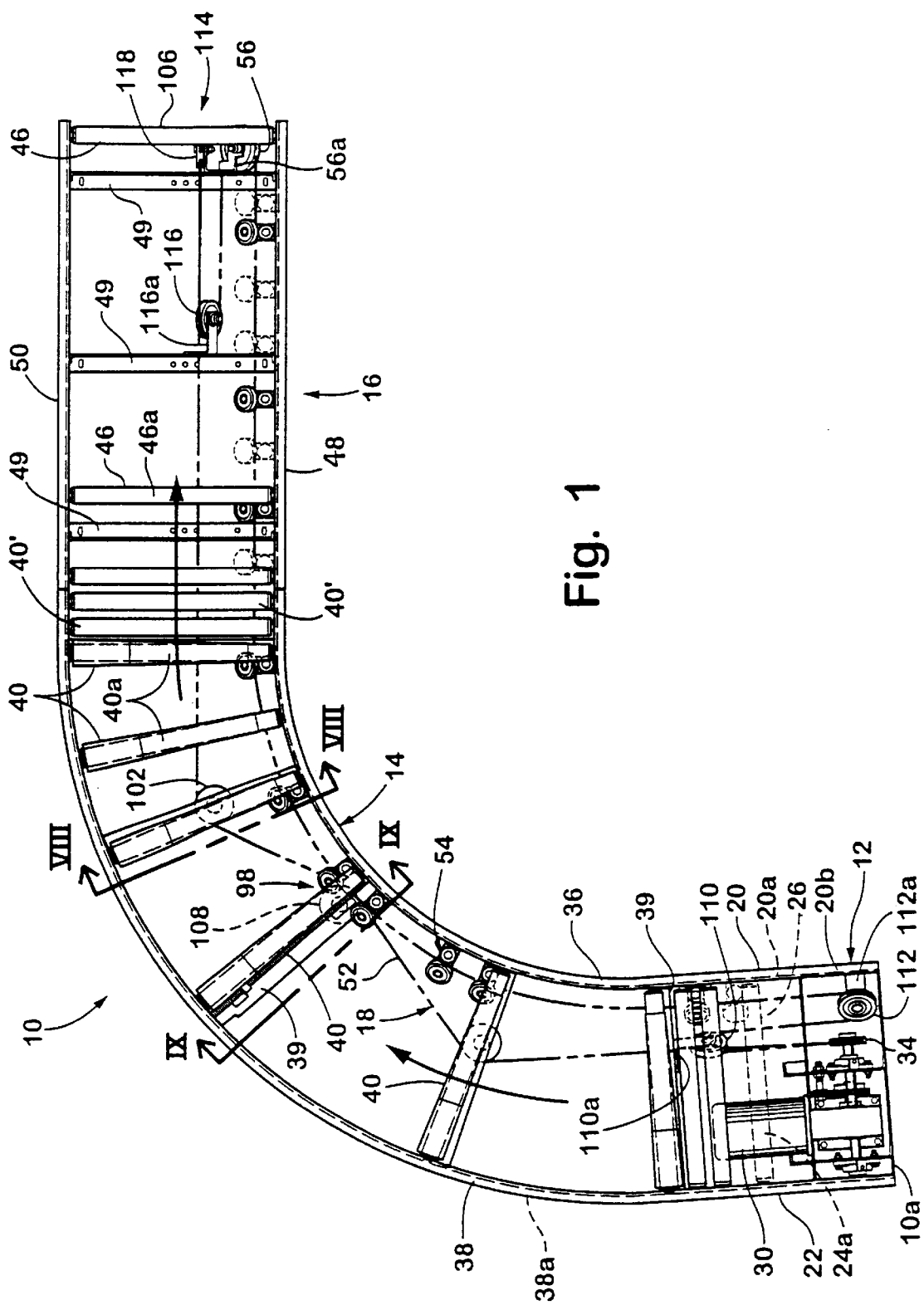
FIG. 1 is a plan view of a driven roller conveyor with a belt driver system of the present invention.

Referring to FIG. 1, the numeral 10 generally designates a conveyor of the present invention. In the illustrated embodiment, conveyor 10 includes a driver section 12, a 90 degree curved conveyor section 14, and a junction conveyor section 16, and a belt driver system 18 although the specific configuration is a function of the application. Belt driver system 18 exhibits an increased life span over conventional round closed loop belts but without the increased noise associated with conventional link belt systems. Furthermore, belt driver system 18 is easy to service. Moreover, belt driver system 18 is not necessarily limited by a maximum belt length as in the case of conventional round belt driver systems, as will be more fully explained below.

Figure 2:
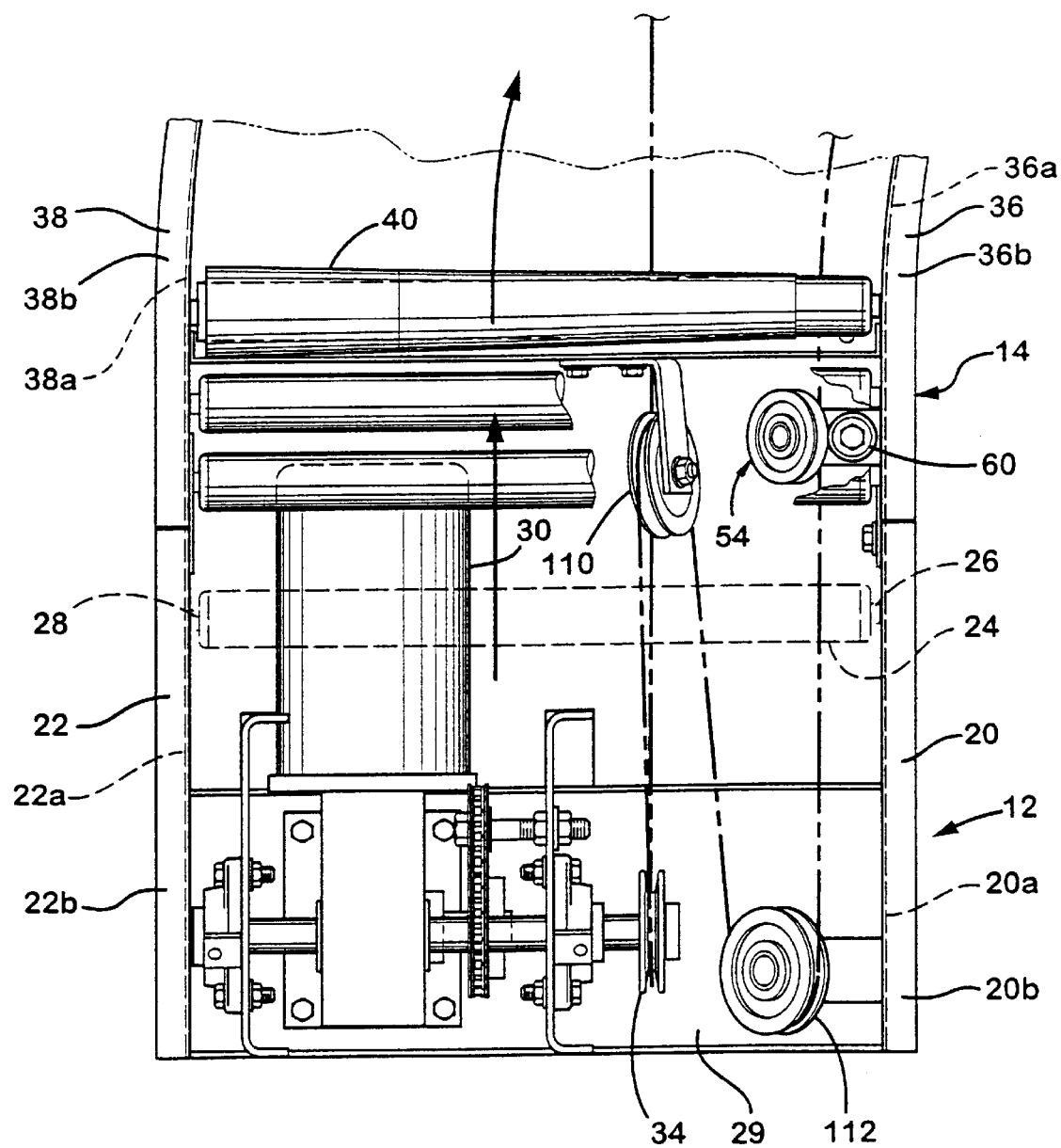
FIG. 2 is an enlarged plan view of a driver section of the conveyor of FIG. 1.

As best seen in FIG. 2, driver section 12 includes a pair of opposed frame members 20 and 22 which respectively support a plurality of rollers 24 (only one shown in phantom for clarity) which are rotatably mounted by respective bearings 26 and 28 in frame members 20 and 22 as would be understood by those skilled in the art. Since the rollers are mounted in a conventional manner to frame members 20 and 22, further detail is not provided herein. Frame members 20 and 22 are preferably interconnected by at least one cross-brace member 29, which also provides support for components of belt driver system 18, as will be more fully described below. Driver section 12 further includes a motor 30, which is mounted between frame members 20 and 22 by cross-brace member 29, and a drive pulley or sheave 34 for driving belt driver system 18. Cross-brace member 29 is secured to the respective web walls 20a and 22a of frame members 20 and 22 in a conventional manner, for example by bolts or welding.

Figure 3:
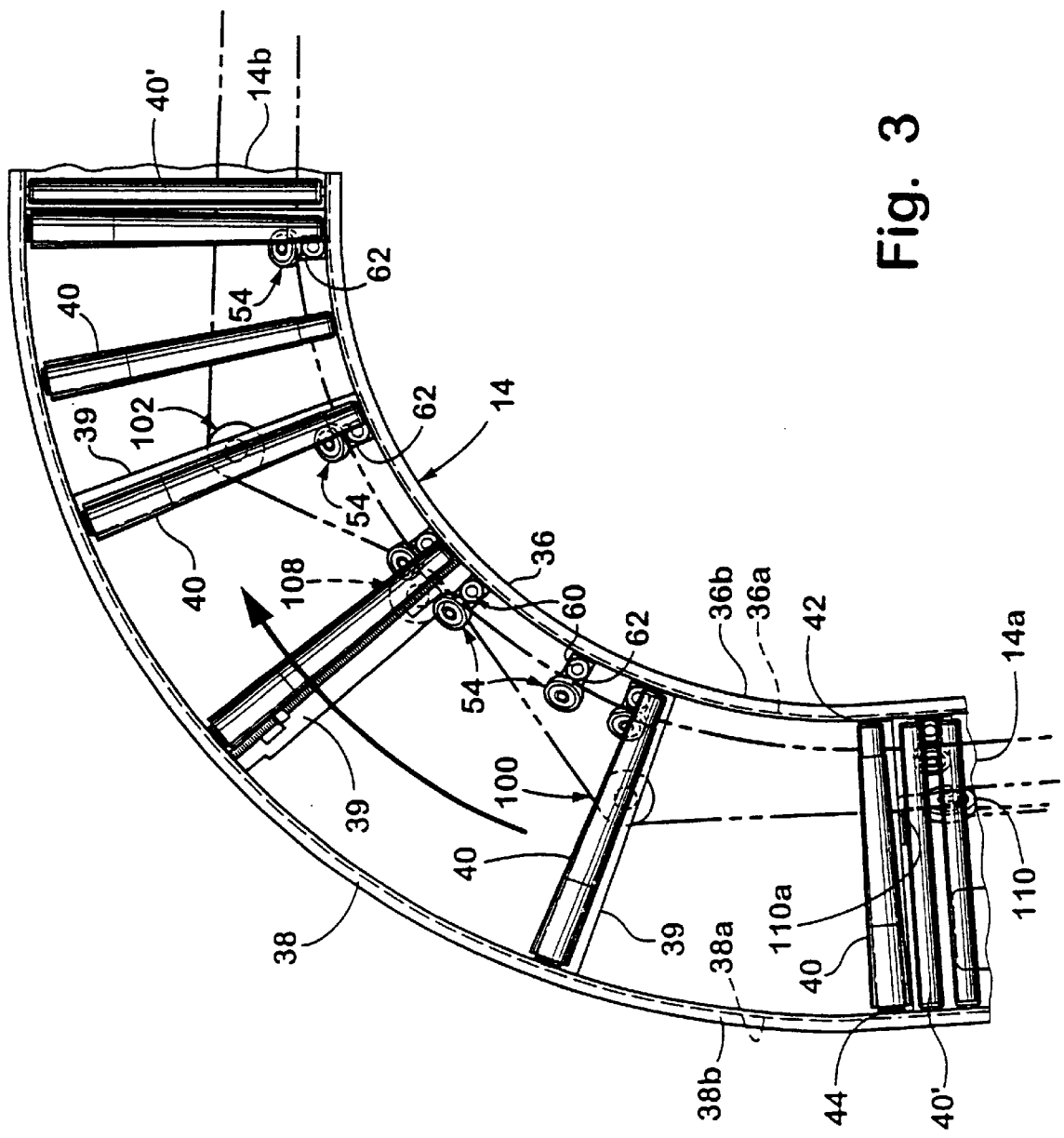
FIG. 3 is a plan view of a curved conveyor section of the conveyor of FIG. 1.
Figure 6:
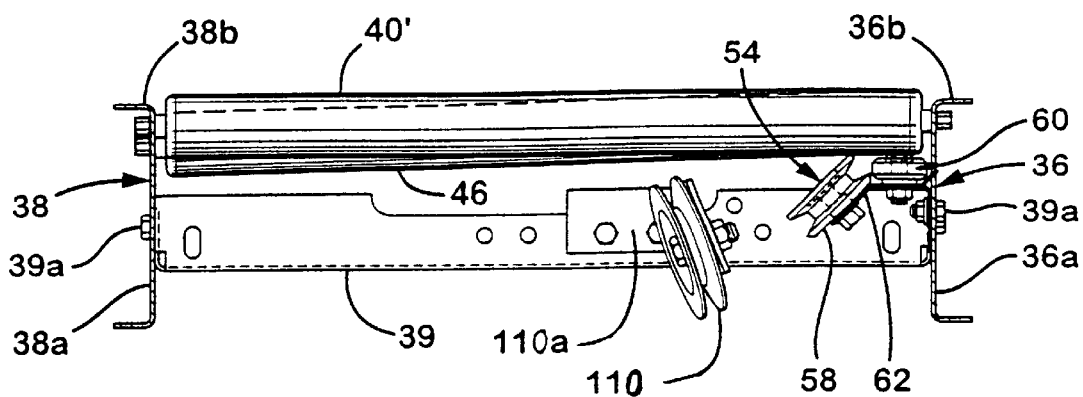
FIG. 6 is an end view of the input side of the curved conveyor section of FIG. 3.

Referring to FIG. 3, curved conveyor section 14 includes inner radius frame member 36 and outer radius frame member 38, which are interconnected by cross-brace members 39, and a plurality of rollers 40 which are rotatably mounted to frame members 36 and 38 by axles 42. Similar to cross-brace members 29, cross-brace members 39 are secured to web walls 36a and 38b of frame members 36 and 38, by for example bolts 39a, and provide support for components of belt driver system 18. Rollers 40 are preferably tapered rollers having smaller diameters at inner radius frame member 36 than at outer frame member 38 so that the outer ends of rollers 40 have an increased speed to compensate for the greater travel distance as would be understood by those skilled in the art. Curved conveyor section 14, however, preferably includes straight rollers 40' at both its input end 14a and its output end 14b, which provide feed and discharge rollers for curved conveyor section 14. Furthermore, like rollers 24, rollers 40 and 40' are preferably uniformly spaced along the conveyor path (indicated by the arrows in FIGS. 1 and 3) to provide a substantially continuous support to articles being transported on conveyor 10.

Referring to FIG. 4, junction conveyor section 16 similarly includes a pair of opposed side frame members 48 and 50, which are interconnected by cross-brace members 49, and a plurality of rollers 46 which are also rotatably supported by bearings 47a and 47b on side members 48 and 50 (FIG. 2). Cross-brace members 49 are also secured to web portions 48a and 50a of frame members 48 and 50 in a conventional manner, for example by bolts 49a. In the illustrated embodiment, frame members 20, 22, 36, 38, 48 and 50 are channel-shaped members and are interconnected at their web portions by angle and channel shaped cross-brace members 29, 39, and 49, respectively; however, it should be appreciated that other frame members and interconnections can be used for conveyor 10 without departing from the spirit or scope of the invention.

As best understood from FIGS. 1 and 5, the respective rollers 24, 40, and 46 are mounted to web portions 20a, 22a, 36a, 38a, 48a, and 50a of frame members 20, 22, 36, 38, 48, and 50, respectively, such that outer support surfaces 24a, 40a, and 46a of rollers 24, 40, and 46 are slightly extended above upper flange portions 20b, 22b, 36b, 38b, 48b, and 50b of frame members 20, 22, 36, 38, 48, and 50, respectively. In this manner, articles transported or conveyed along conveyor 10 are freely transported across conveyor 10 without interference from frame members 20, 22, 36, 38, 48, or 50.

Figure 7:
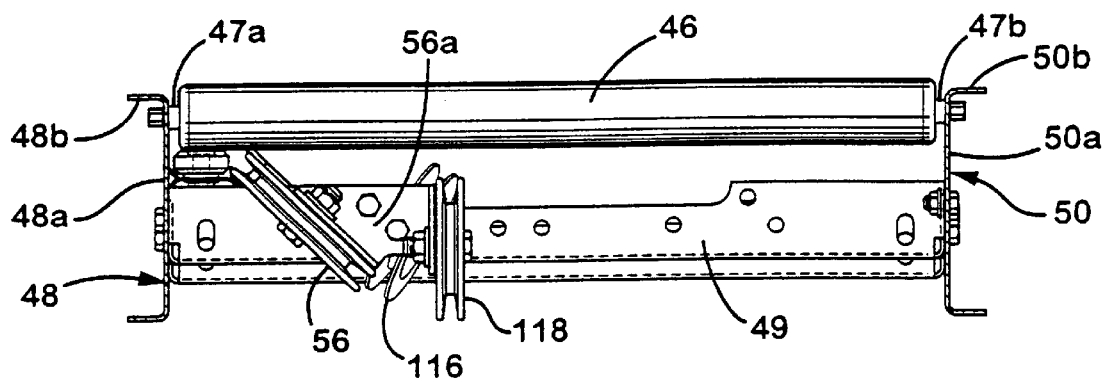
FIG. 7 is an end view of the discharge side of the junction conveyor section of FIG. 2.
Figure 8:
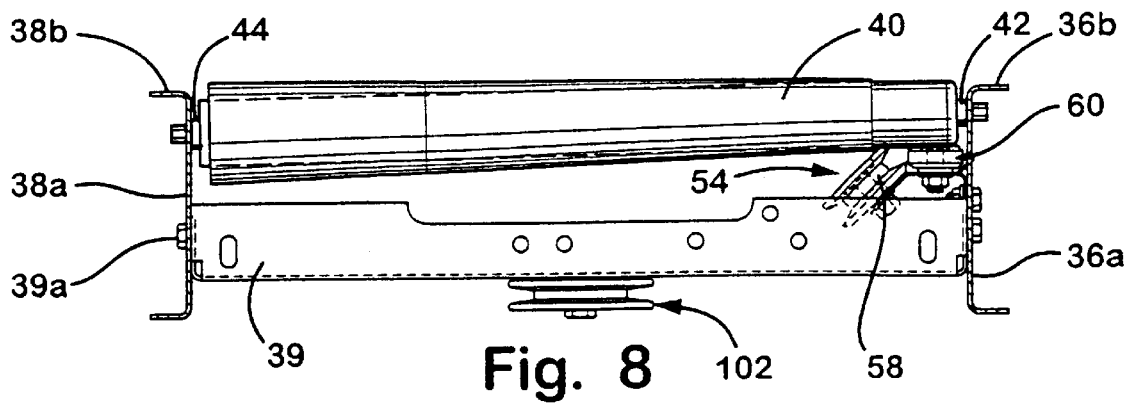
FIG. 8 is a cross-sectional view taken along line VIII—VIII of FIG. 1.
Figure 9:
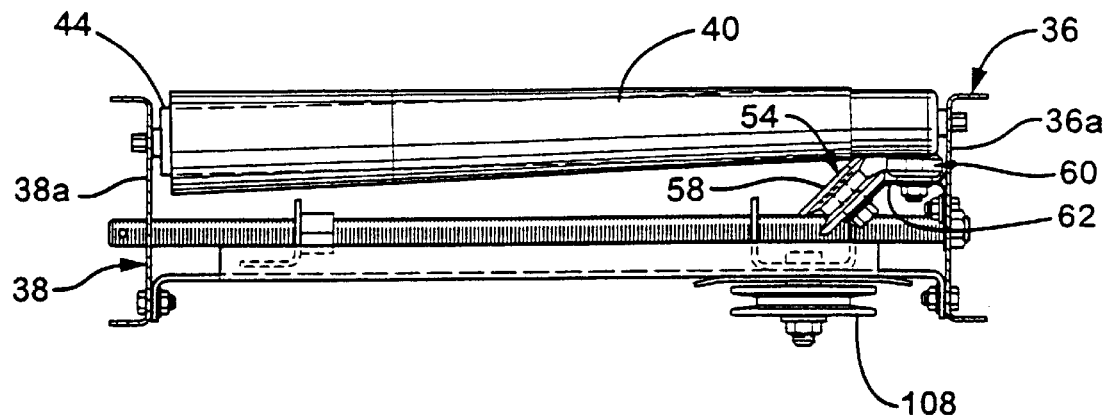
FIG. 9 is a cross-sectional view taken along line IX—IX of FIG. 1.

Referring to FIGS. 1–4, rollers 24, 40, and 46 are driven by belt driver system 18. Belt driver system 18 includes a continuous belt 52 and a plurality of spring pulley assemblies 54 which support and guide belt 52 along the inner side of driver section 12, the inner portion of curved conveyor section 14, and along the inner side of junction conveyor section 16 in order to directly drive rollers 24, 40, and 46 with belt 52. By driving the tapered rollers at the inner radius of curved conveyor section 14, curved conveyor section 14 operates at the same speed as the feed side 10a of conveyor 10. Belt 52 is returned from the discharge end 10b of conveyor 10 by a return pulley 56 which is mounted to cross-brace member 49 by a mounting bracket 56a (FIG. 7), which will be more fully described below.

Figure 10:
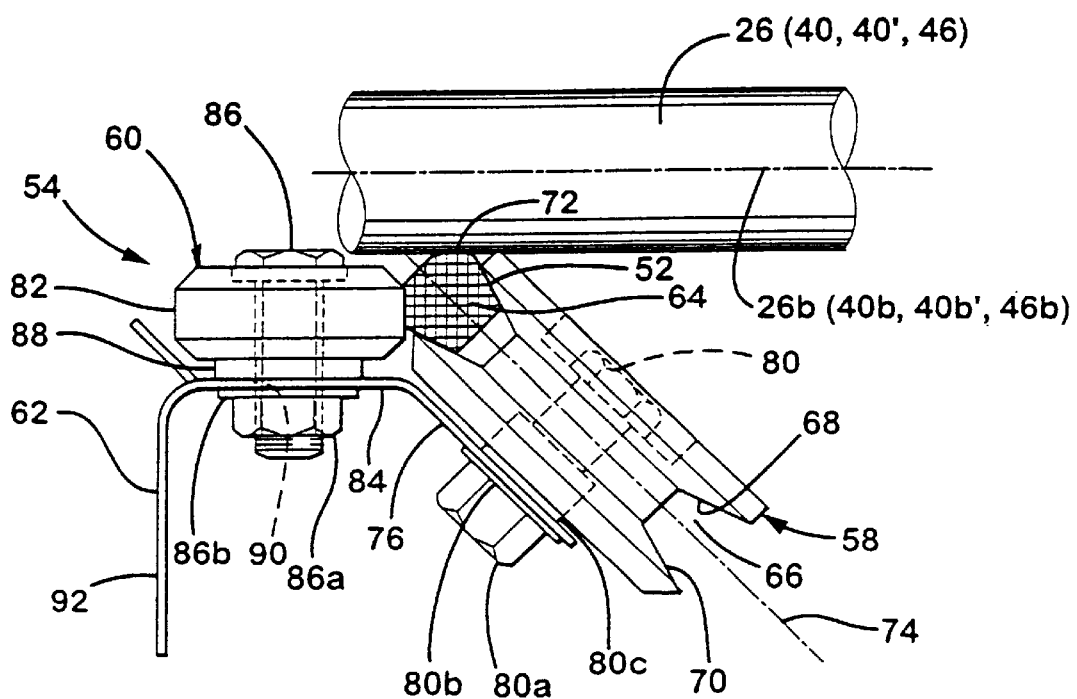
FIG. 10 is an enlarged elevation of a spring pulley assembly of the belt driver system of FIG. 1.
Figure 11:
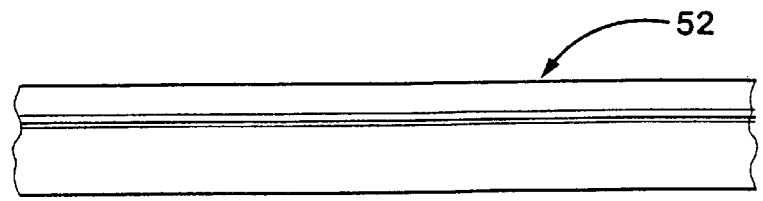
FIG. 11 is a side view of a section of the belt of the belt driver system of the present invention.
Figure 12:
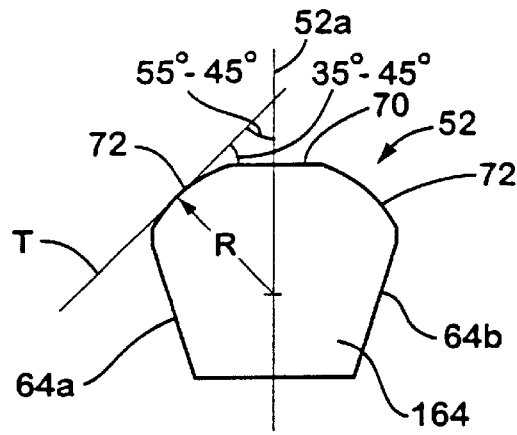
FIG. 12 is a cross-section taken along line XII—XII of FIG. 11.
Figure 13:
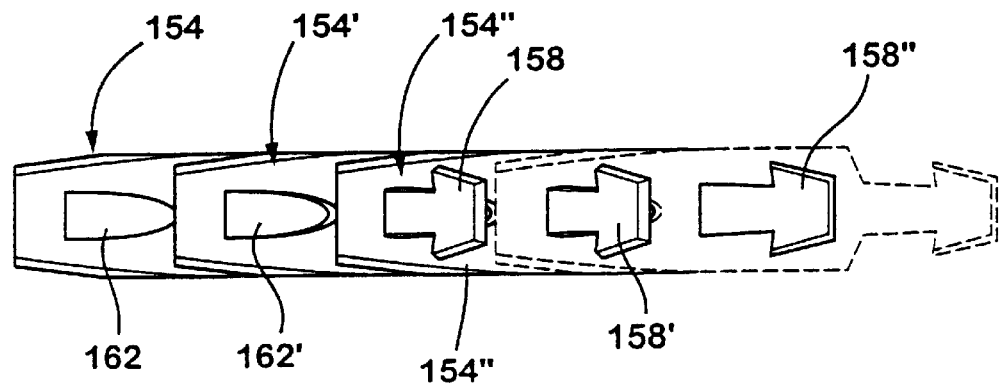
FIG. 13 is a bottom view of a second embodiment of a belt.
Figure 14:
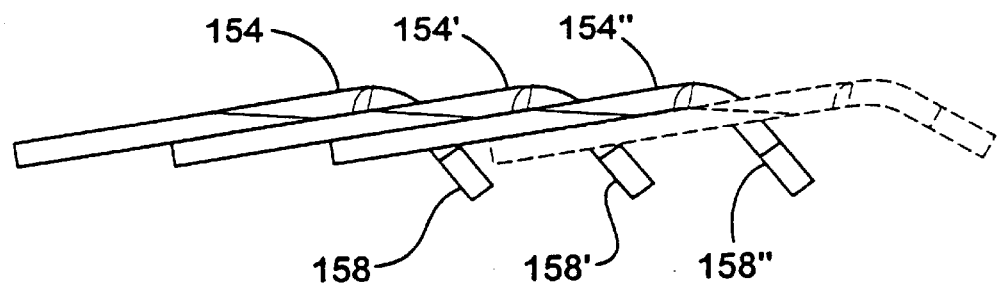
FIG. 14 is a side view of the belt of FIG. 13.
Figure 16:
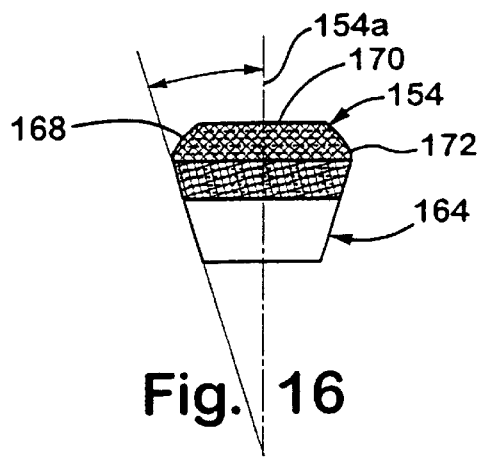
FIG. 16 is a cross-section view taken along line XVI—XVI of FIG. 15.
Figure 19:
FIG. 19 is a cross-section taken along line XIX—XIX of FIG. 17.

As best seen in FIG. 10, each spring pulley assembly 54 includes a grooved sheave or pulley 58 and an optional lateral restraint 60 which are supported on and mounted to webs 20a, 36a, and 48a of frame members 20, 36, and 48, respectively, by a spring mounting member 62. Referring to FIG. 12, belt 52 preferably includes a V-shaped base portion 64 with opposed side walls 64a and 64b which have a profile generally commensurate in shape with the groove 66 of pulley 58 (FIG. 10). In this manner, when belt 52 is tensioned (as will be described below), and driven by drive pulley 34, belt 52 is laterally supported between side walls 68 and 70 of pulley 58. In order to drive rollers 24, 40, 40', and 46, belt 52 further includes a generally continuous linear drive edge 72 that provides substantially continuous contact with rollers 24, 40, 40', and 46 which reduces the vibration and, hence, noise associated with conventional link belts. In order to contact rollers 24, 40, 40', and 46 with edge 72, belt 52 is preferably oriented along an axis 74 which forms an angle in a range of 20 to 60 degrees with respect to the longitudinal axes 24b, 40b, 40b', and 46b of rollers 24, 40, 40', and 46, respectively, as measured clockwise in FIG. 10. Most preferably, axis 74 is angled at about 45 degrees with respect to axes 24b, 40b, 40b', and 46b. In order to support belt 52 at the desired angle, pulley 58 is mounted to a first mounting portion 76 of spring mounting member 62 by a bolt 80, which first portion 76 is generally angled at the same angle as axis 74. Bolt 80 is secured in place by a nut 80a and, preferably, by a lock washer 80b. Furthermore, pulley 58 may include one or more spacers or washers 80c to space pulley 58 from portion 76.

Each lateral restraint 60 preferably includes a bearing or wheel 82 (FIG. 10) or a low friction surface or member which is mounted to a second mounting portion 84 of spring mounting member 62 and to restrain belt 52 in grooved sheave 58. In the illustrated embodiment, lateral restraint 60 includes a bearing or wheel 82 which is rotatably mounted to spring mounting member 62. In this manner, when belt 52 is tensioned and driven around the inner radius of curved conveyor section 14, bearing or wheel 82 will rotate as belt 52 passes across pulley 58 and will restrain belt 52 from lifting out of groove 66, which will help eliminate twisting of belt 52 and will minimize the vibration of belt 52. Bearing 82 is rotatably mounted to portion 84, for example, by a mounting bolt 86 which extends through bearing 82 and a bearing insert 88 and through a corresponding opening 90 provided in second mounting portion 84. Bolt 86 is secured in place by a nut 86a and preferably by a lock washer 86b. Spring mounting member 62 includes a third mounting portion 92 with one or more openings 94 for mounting spring mounting member 62 to the respective webs 20a, 36a, and 48a of the respective side members 20, 36, and 48. As best seen in FIG. 10, first mounting portion 76 is cantilevered from second and third mounting portions 84 and 92 which forms a spring. In this manner, spring mounting member 62 orients belt 52 to contact the rollers with edge 72 and maintains sufficient contact between belt 52 and rollers 24, 40, and 46 to directly drive rollers 24, 40, 40', and 46 but reduces pressure on rollers 24, 40, 40', and 46 to minimize wear and tear on the belt, grooved sheave, and rollers.

Referring again to FIG. 1, belt 52 extends over spring pulley assemblies 54 and over return pulley 56 which is positioned at discharge end 10b of conveyor 10. Return pulley 56 is preferably oriented at a similar angular orientation to spring pulley assembly 54 in order to maintain the orientation of belt 52 and prevent twisting. In order to maintain the proper tension on belt 52, belt drive system 18 optionally includes a take-up assembly 98. As best seen in FIG. 3, take-up assembly 98 consists of a pair of guide pulleys 100 and 102 which are supported on respective cross members 39 which extend between frame members 36 and 38. Pulleys 100 and 102 are oriented in a horizontal plane and guide belt 52 from return pulley 56 over a tensioner pulley 108, which is similarly mounted on a cross member 39 in a conventionally known manner, to driver pulley 34. In order to maintain the belt's proper orientation, belt driver system 18 further includes a compound angle return pulley 110 and a second return pulley 112 at input end 10a. After belt 52 extends over driver pulley 34, it is returned to its proper orientation for spring pulley assemblies 54 by pulleys 110 and 112. Compound angle return pulley 110 is mounted by a mounting bracket 110a to cross member 39. Second return pulley 112, on the other hand, is mounted to web 20a of driver frame member 20 by a mounting bracket 112a.

Preferably, belt drive system 18 further includes a slave drive assembly 114 which is positioned at discharge end 10b of conveyor 10. Slave drive assembly 114 permits belt 52 to change from lateral side of the conveyor to the other lateral side or to be driven by an adjacent conveyor section and includes a compound angle pulley 116 which receives belt 52 from return pulley 56 and which redirects belt 52 to a generally vertically oriented drive slave pulley 118. Angle pulley 116 is supported by cross-member 49 by a mounting bracket 116a and is provided to maintain the proper orientation of belt 52. For example, pulley 116 is angled in a range of 7 to 15 degrees from the vertical direction (as measured clockwise in FIG. 7) and, most preferably, at about 10 degrees from the vertical direction. Slave drive pulley 116 then directs belt 52 back to guide pulley 102 which in turn directs belt 52 to tensioner pulley 108 of take-up assembly 98.

Figure 15:
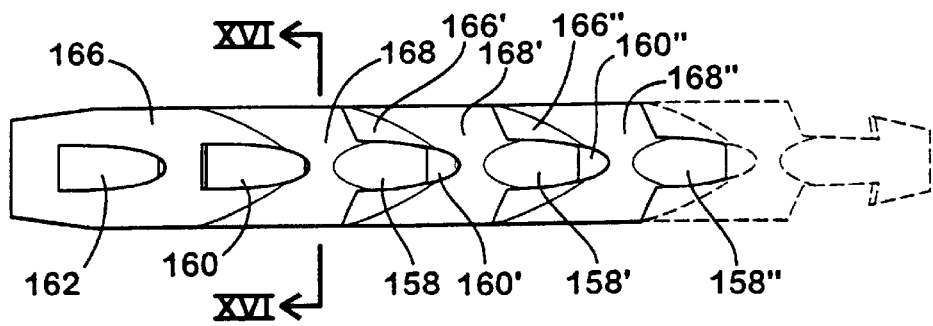
FIG. 15 is a plan view of the belt of FIG. 13.
Figure 17:
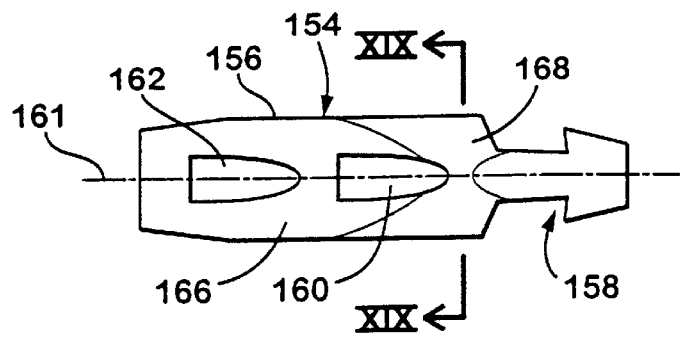
FIG. 17 is a plan view of one link of the belt of FIG. 13.
Figure 18:
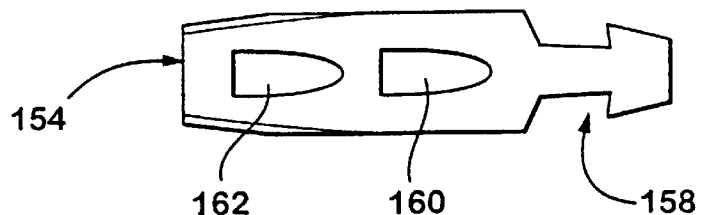
FIG. 18 is a plan view of the link of FIG. 17.

Referring to FIGS. 13–19, a second embodiment of belt 152 is illustrated. Similar to belt 52, belt 152 includes a base 164, a rounded upper surface 170, and a driving edge 172. As best seen in FIG. 15, edge 172 is offset from belt axis of symmetry 154a and provides a continuous linear driving surface for driving the rollers. Preferably, edge 172 is offset at an angle of 35 to 45 degrees from driving surface 170 and, most preferably, about 40 degrees. In this embodiment, belt 152 comprises a link belt configuration and includes a plurality of link members 154. Each link member 154 includes a body portion 156 and a connector portion 158 which projects from body portion 156 for coupling link member 154 to second and third link members 154' and 154". It should be understood from FIGS. 13–15, each link of link belt 152 couples to second and third links except the last link which couples to the first and second links to create a desired length of closed loop belt 152. Body portion 156 includes first and second elongate openings 158 and 160 which are aligned along a common axis 161. Body 156 includes a generally planar upper surface portion 166 and a tapered surface portion 168 at the juncture of connector portion 158 and body 156. When first, second, and third links 154, 154', and 154" interlock together, belt 152 includes three overlapping links 154, 154', and 154" with connector portion 158 extending through opening 160' of second link 154' and through opening 162" of third link 154", thus, interconnecting the links together. Furthermore, the interconnecting portion 158' of second link 154' extends through opening 160" of third link 154" and through an opening in a fourth link (shown in phantom). When interconnected, the links define a closed loop belt which includes a generally rounded outer surface 170 and a V-shaped base 164 which is commensurate in size with groove 66 of pulley 58. Moreover, tapered portions 168 of body 156 along with portions of upper surfaces 166 define a continuous and substantially linear edge for driving rollers 26, 40, 40', and 46. Thus, in this embodiment, belt 152 maintains substantially continuous contact with the rollers, which minimizes the noise, and, further, when belt 152 needs to be replaced or repaired, individual links 154 may be disconnected and replaced or disconnected for replacement of the entire belt without disassembly of the conveyor. Preferably, links 154 are reinforced polyurethane elastomers, for example polyurethane elastomer reinforced with multiple plies of polyester fabric. Consequently, belt 152 exhibits excellent resistance to extreme temperatures and abrasion, and to exposure to oils, grease, water, steam, and common industrial solvents.

Figure 20:
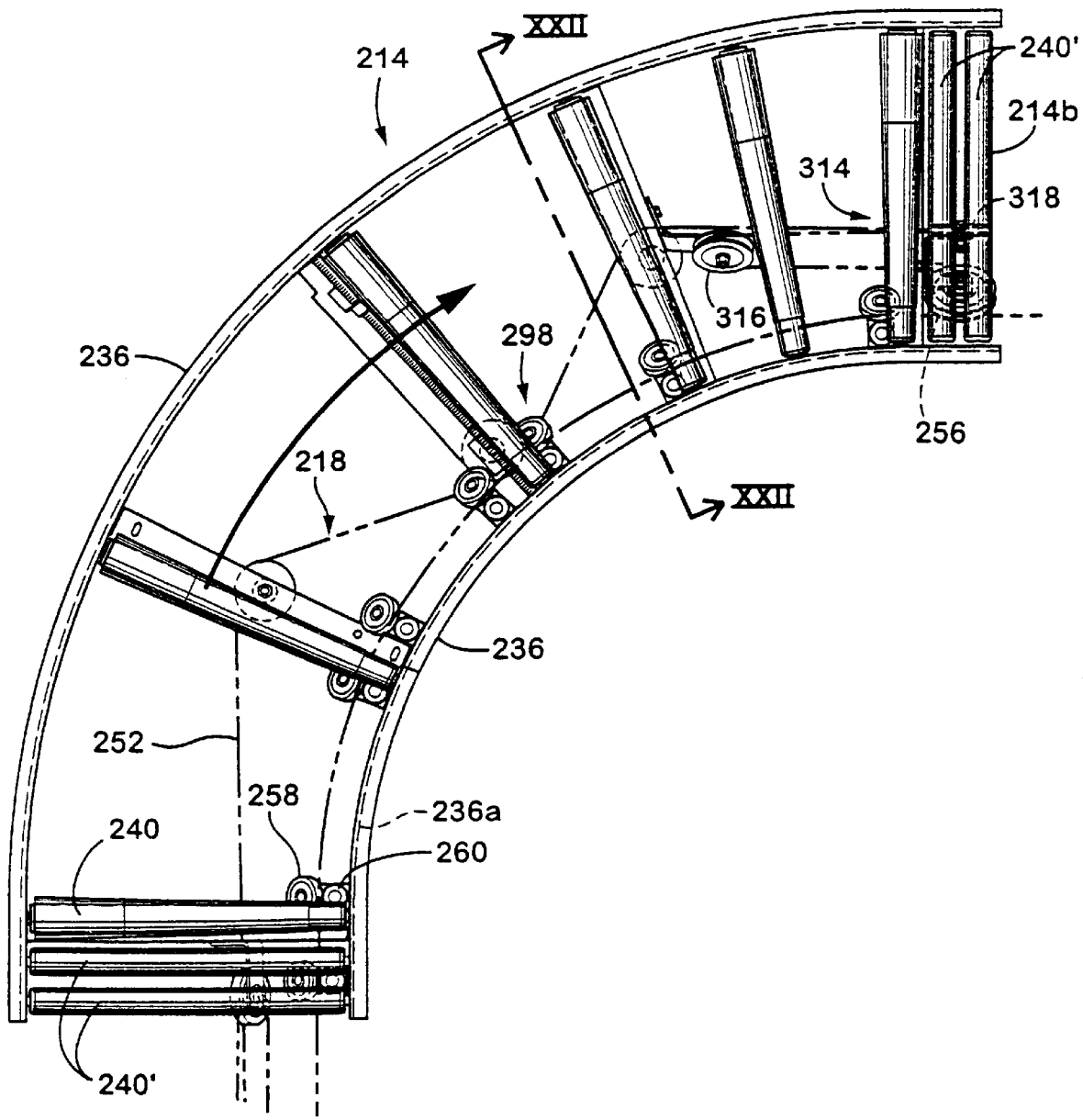
FIG. 20 is a second embodiment of a curved conveyor section of the present invention.

In FIG. 20, a second embodiment of a curved conveyor section 214 is illustrated. Curved conveyor section 214 includes a belt driver system 218 which is driven by driver section 12 similar to conveyor 10; however, curved conveyor section 214 is a stand alone curved conveyor in that no junction conveyor section is used. Additionally, curved conveyor section 214 includes a return pulley 256 at its discharge side 214b and may also include a slave drive assembly 314 so that an adjacent conveyor section can be driven by this curve.

Figure 21:
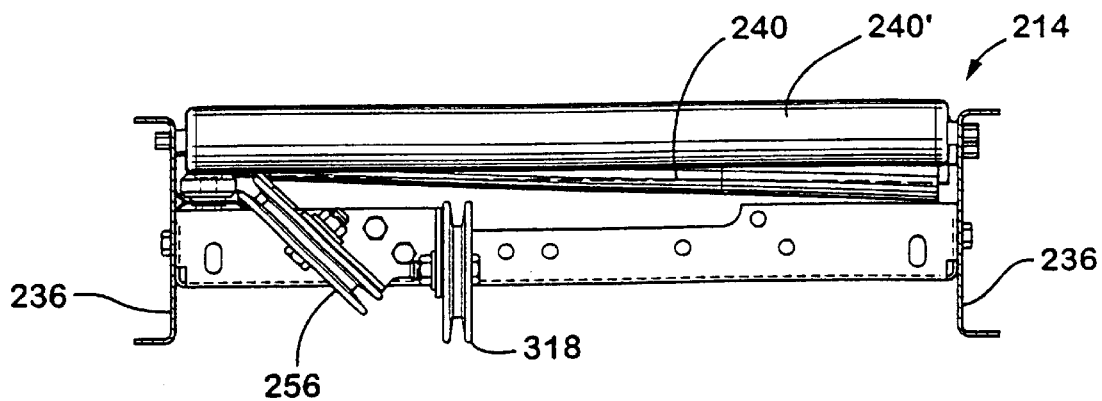
FIG. 21 is an end view of the discharge side of the curved conveyor section of FIG. 20.
Figure 22:
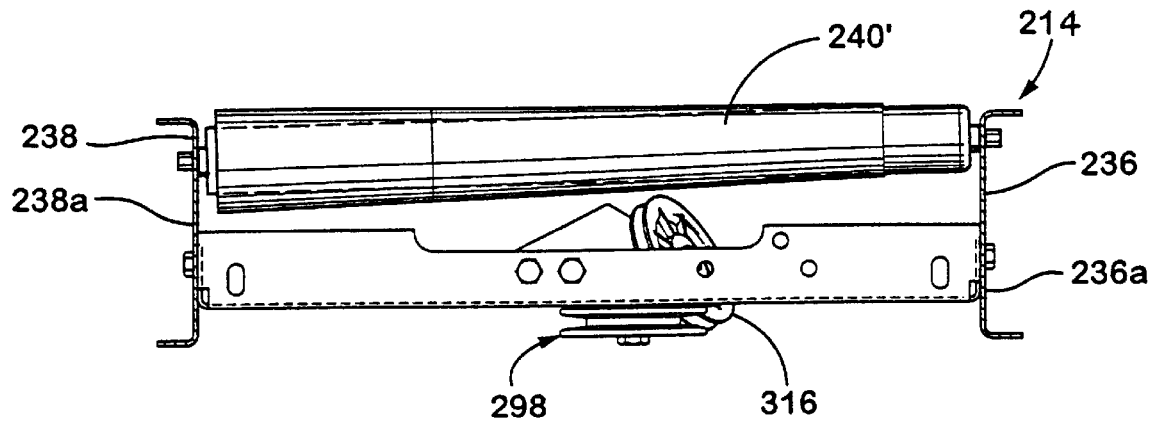
FIG. 22 is a cross-section view taken along line XXII—XXII of FIG. 20.

Curved conveyor section 214 is of similar construction to curved conveyor 14 and includes an inner radius frame member 236 and outer radius frame member 238 which support a plurality of input and discharge rollers 240' and tapered rollers 240 which are uniformly spaced along curved conveyor section 214 as would be understood by those skilled in the art. Belt driver system 218 is also of similar construction to belt driver system 18 and includes a closed loop belt 252 which is of similar construction to belt 52 and which is supported by a plurality of spring pulley assemblies 254. Spring pulley assemblies 254 include groove pulleys 258 which are mounted to web portions 236a of inner radius frame member 236 by spring mounting members 262. Again, similar to the first embodiment, each spring pulley assembly 254 includes a lateral restraint 260 in the form of bearing wheels which are rotatably mounted to an upper portion of spring mounting members 262. It should be understood from FIG. 20, belt 252 extends over and is supported by spring pulley assemblies 254 and then is returned by return pulley 256 to slave assembly 314. As described in reference to the first embodiment, slave system 314 includes a compound angle pulley 316 (FIG. 22) and a generally vertically oriented pulley 318 which defines a slave pulley (FIG. 21). Slave pulley 318 then redirects belt 252 back to a take-up assembly 298. Take-up assembly 298 is a similar configuration to take-up assembly 98 and, therefore, reference is made to the first embodiment for further details.

Figure 23:
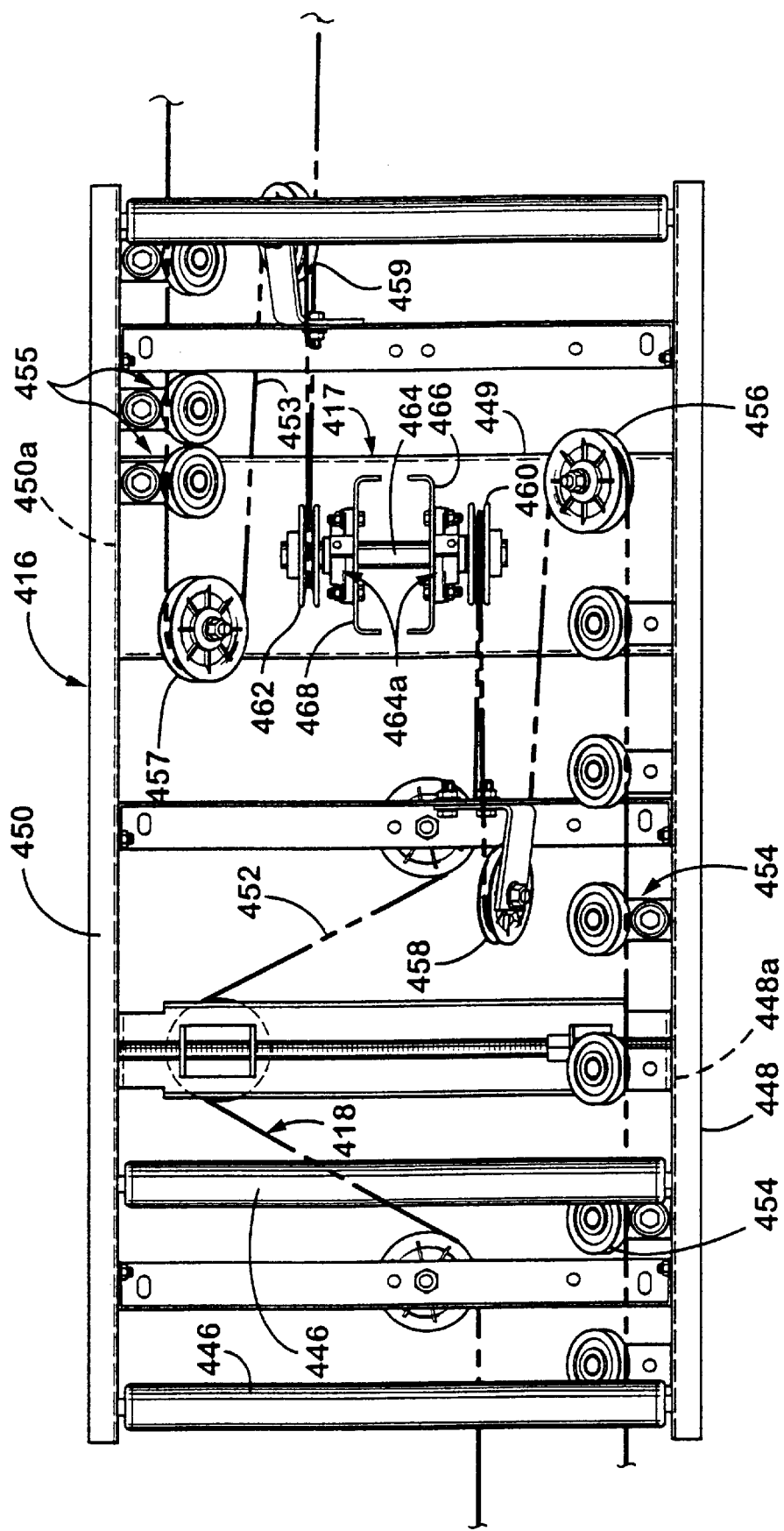
FIG. 23 is a second embodiment of a junction conveyor section of the present invention.

Referring to FIG. 23, a second embodiment of junction conveyor section 416 is illustrated. In this embodiment, junction conveyor section 416 includes a coupler 417 which permits belt driver system 418 to be switched from one side of the conveyor to the other side of the conveyor, which is particularly useful when the junction conveyor is discharged into a reversed 90 degree curve conveyor section as will be understood by those skilled in the art, and, further, may provide a slave drive sheave. Referring to FIG. 23, junction conveyor section 416 is of similar construction to junction conveyor section 16 and includes a pair of opposed side frame members 448 and 450 which support a plurality of rollers 440 and 440' on respective bearings 442 and 444. Belt driver system 418 includes a continuous belt 452 which is supported on a plurality of spring pulley assemblies 454 which are respectively mounted to a web portion 448a of side frame member 448. For details of belt 452 and spring pulley assemblies 454, reference is made to belt drive system 18 of the first embodiment. Belt drive system 418 further includes a second closed loop belt 453 and a second plurality of spring pulley assemblies 455, which are respectively mounted to web portions 450a of side frame member 450 down stream of spring pulley assemblies 454. Belts 452 and 453 are drivingly coupled together by coupler 417 which comprises a pair of pulleys 460 and 462 which are commonly rigidly mounted to a shaft 464. As noted previously, coupler 417 may also provide a slave drive, with pulley 462 comprising a slave drive pulley. Shaft 464 is rotatably supported by a pair of mounting members 466 and 468 which are respectively supported on a cross-brace member 449 which extends between and is secured to side frame members 448 and 450. Shaft 464 is rotatably mounted in support members 466 and 468 on bearings 464a, as would be understood by those skilled in the art.

Figure 24:
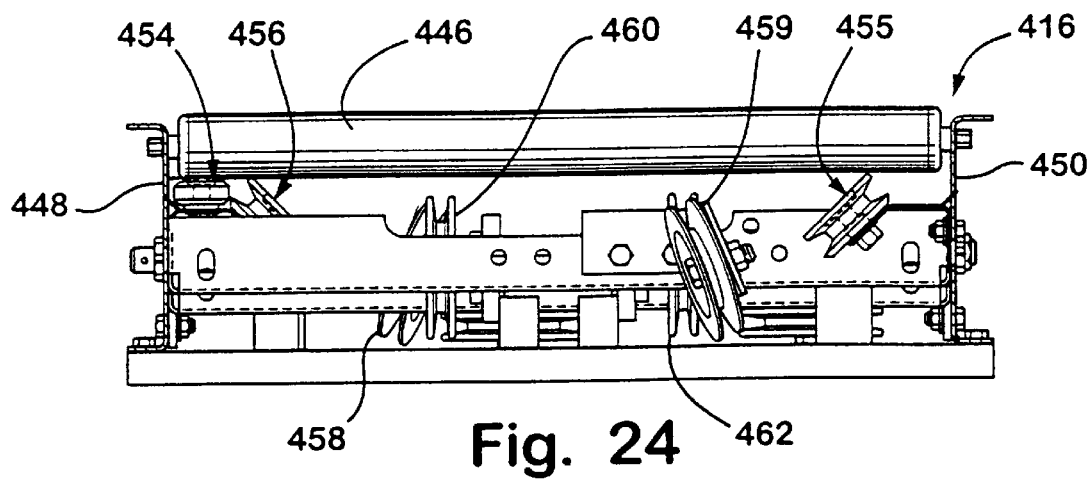
FIG. 24 is an end view of the discharge end of the junction conveyor section of FIG. 23.

As best seen in FIGS. 23 and 24, belt driver system 418 further includes a first return pulley 456 and a compound angle pulley 458 which direct belt 452 from spring pulley assemblies 454 to pulley 460 of coupler 417 while maintaining the orientation of belt 452. In a similar manner, belt 453 is directed from spring pulley assembly 455 over a second return pulley 457 and a second compound angle pulley 459 to second pulley 462 of coupler 471 in order to maintain the proper orientation of belt 453.

It should be understood from the foregoing, that conveyor 10 may include one or more of the described conveyor sections. Furthermore, curved conveyor sections 14 or 214 may comprise 30 degree, 45 degree, or 60 degree angle curves in addition to the 90 degree curved sections described in reference to the illustrated embodiments. Likewise, junction assemblies 16 and 416 may comprise 30 degree, 45 degree, 60 degree, or the 90 degree junction assemblies described in the illustrated embodiments. Moreover, each of the respective conveyor sections can be combined to achieve the desired conveyor configuration.

Figure 25:
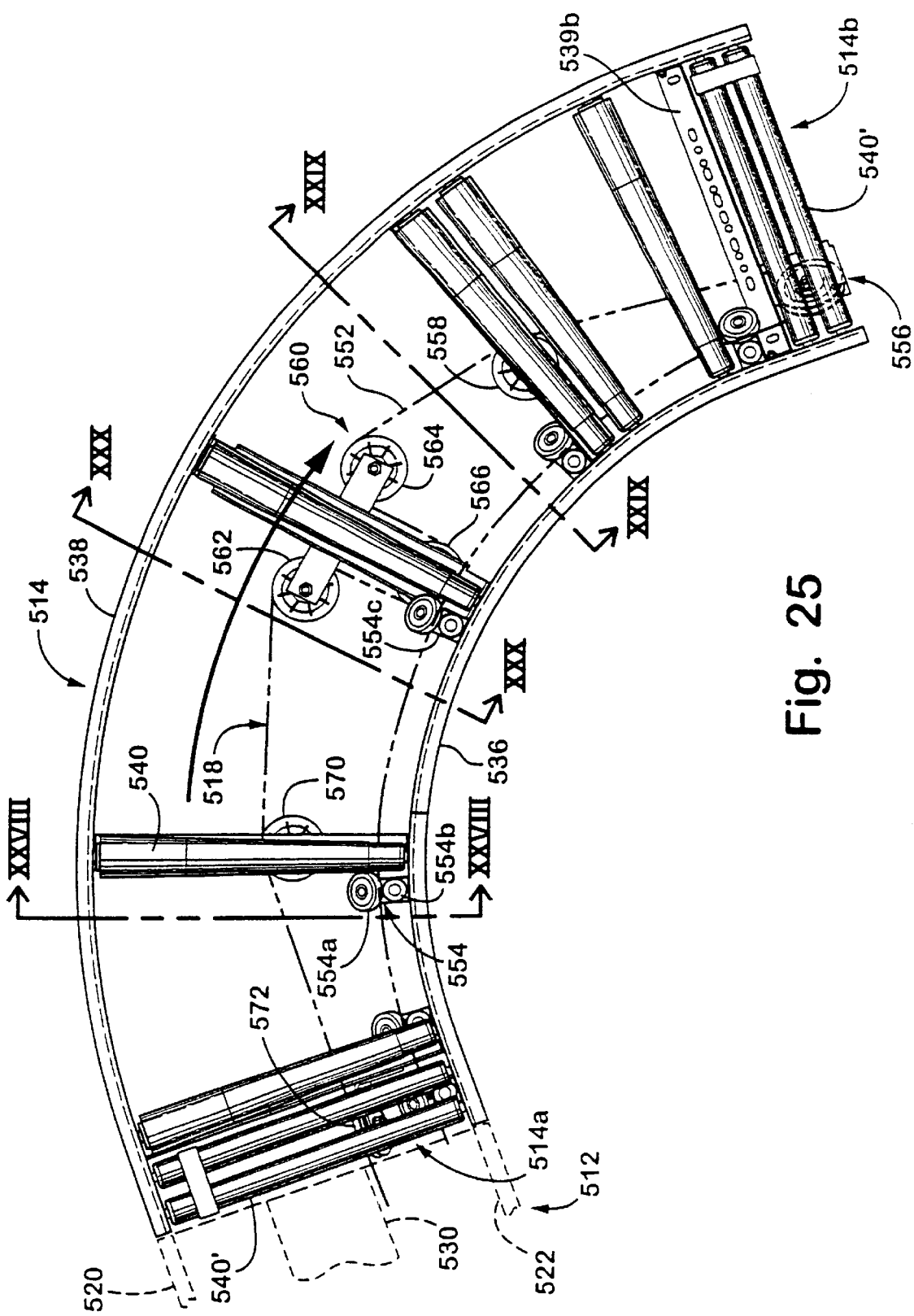
FIG. 25 is a third embodiment of a curved conveyor section of the present invention.
Figure 26:
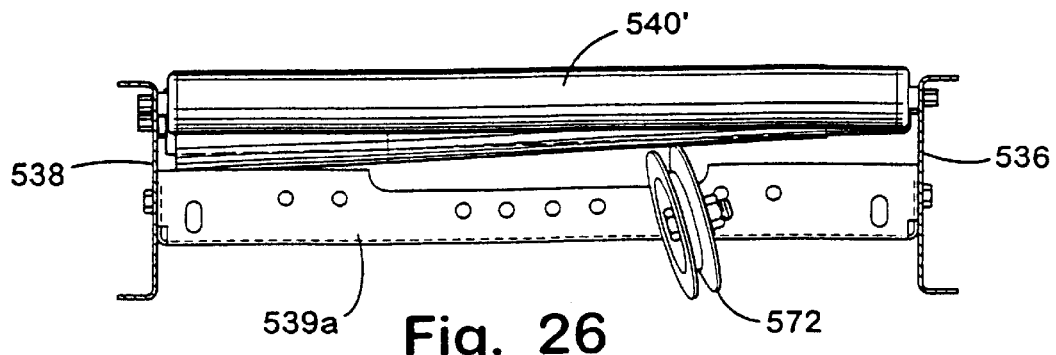
FIG. 26 is an elevation view of the input end of the curved conveyor section of FIG. 25.
Figure 27:
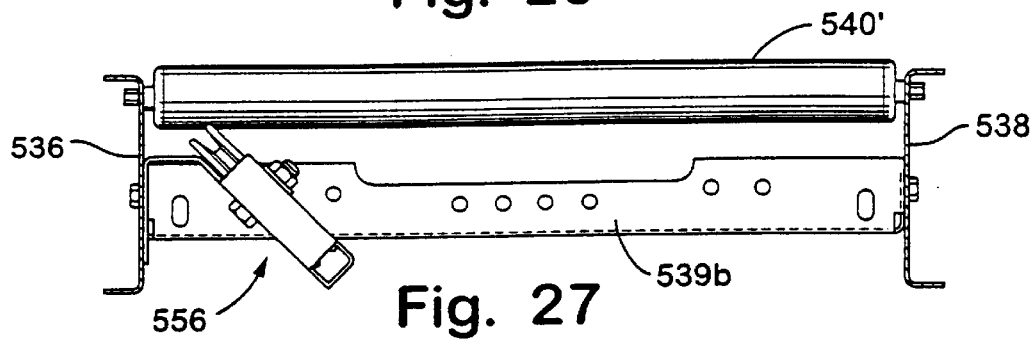
FIG. 27 is an end elevation view of the discharge end of the curved conveyor section of FIG. 25.
Figure 28:
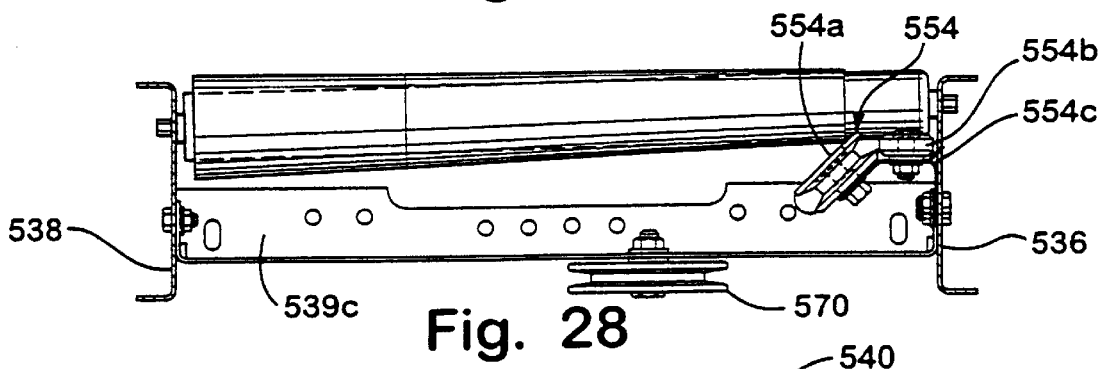
FIG. 28 is cross-sectional view taken along line XXVIII—XXVIII of FIG. 25.
Figure 29:
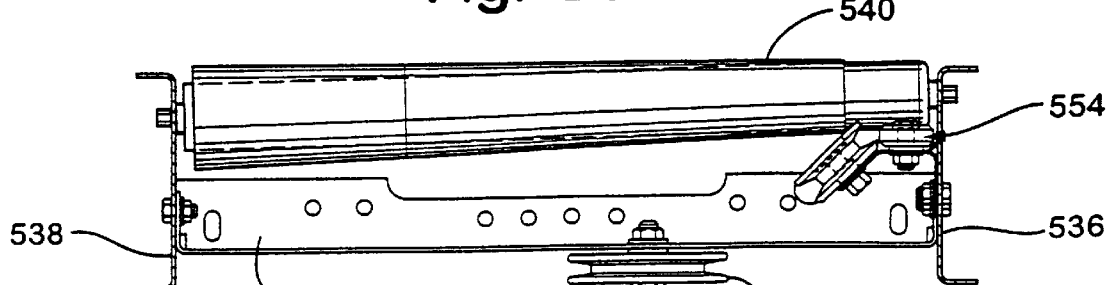
FIG. 29 is a cross-sectional view taken along line XXIX—XXIX of FIG. 25.

Referring to FIG. 25, a third embodiment 514 of the curved conveyor section is illustrated. Curved conveyor section 514 is of similar construction to the previous curved conveyor sections and includes an inner radiused frame member 536 and an outer radiused frame member 538, which are interconnected by cross-brace members, for example cross-brace members 539a, 539b, 539c, 539d, and 539e. Supported between frame members 536 and 538 are a plurality of tapered rollers 540 and straight rollers 540'. The straight rollers 540' are positioned at the respective feed or input and discharge ends 514a and 514b of the curved conveyor section 514. Rollers 540 and 540' are driven by a belt driver system 518, which includes a continuous belt 552. Belt driver system 518 is of similar general construction to the previous embodiments and is driven by a driver section 512 described below.

Belt driven system 518 includes drive belt 552, a plurality of spring assemblies 554, a return pulley or sheave 556, and a tensioner assembly 560. Spring assemblies 554 are mounted to inner radiused frame member 536 and guide and support belt 552 along the inner radius of curved conveyor section 514. Belt driver system 518 further includes a redirection pulley 572, which is positioned at the input end of curved conveyor section 514 to reorient the belt from the tensioner assembly 560 and direct belt 552 to the driver section 512, as will be more fully described below. As described in reference to the previous embodiment, belt 552 includes a non-circular base and a substantially continuous driving surface for drivingly engaging rollers 540 and 540'.

Figures 33, 34:
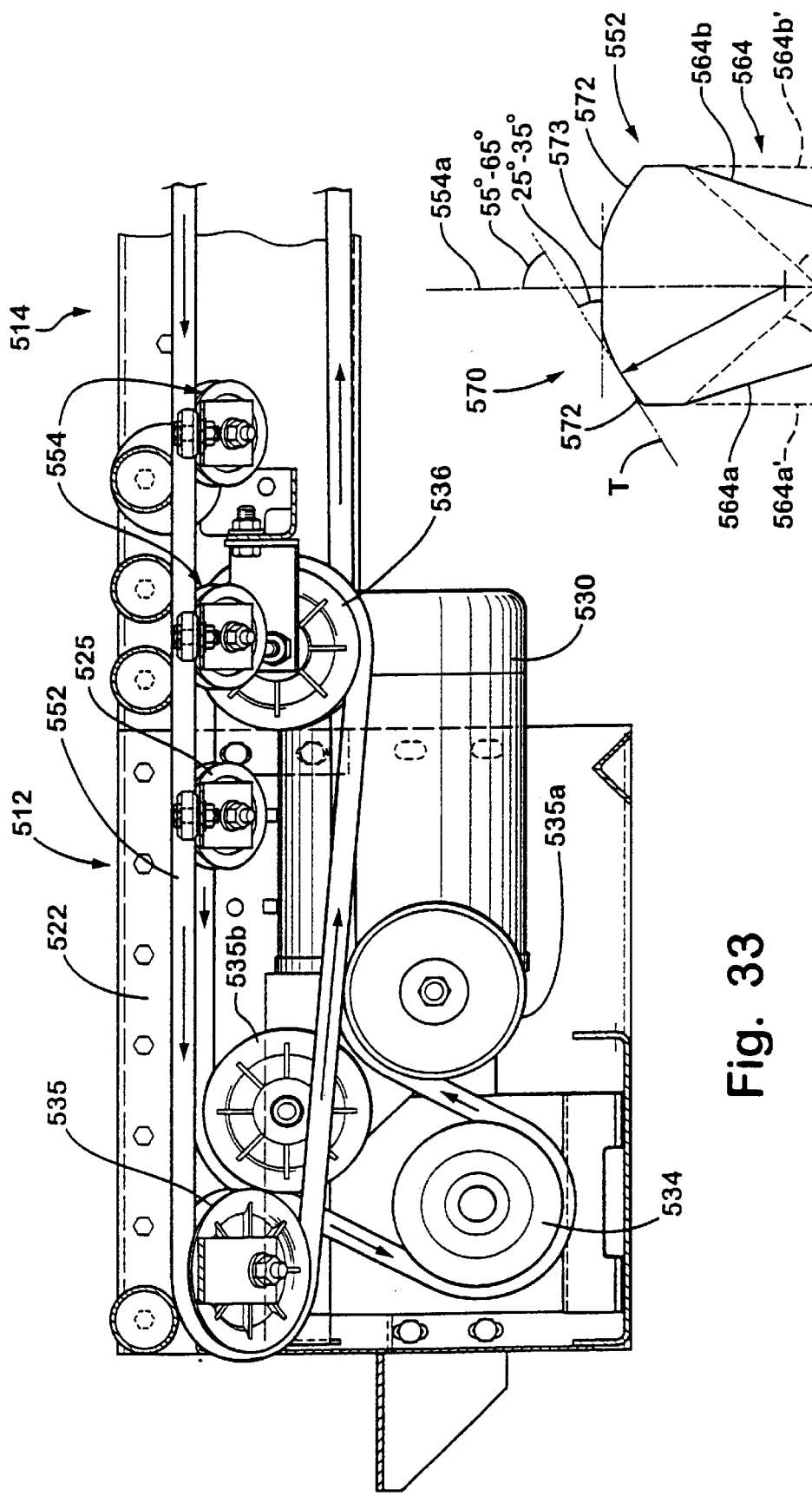
FIG. 33 is a side elevation view of the driver section of FIG. 31.
FIG. 34 is a cross-section similar to FIG. 12 illustrating a third embodiment of a driver belt.

Referring to FIG. 34, in preferred form belt 552 includes a V-shaped base portion 564 with opposed side walls 564a and 564b, which are angled inwardly and form a profile commensurate in shape with the grooves of the pulleys of the driver system 518. As shown in FIG. 34, base portion 564 may include generally parallel sides 564a' and 564b' or sharply angled sides 564a" and 564b". Further, the angle between the sides may be varied between 564a', 564b' and 564a", 564b" as needed. Belt 552 further includes a generally rounded outer surface 570 which includes a pair of substantially continuous driving surfaces or edges 572 and a flat central surface 573 between driving surfaces 572. Driving surfaces 572 have a slightly rounded surface and are provided or formed offset from a central axis 554a of belt 552 at an angle in a range of about 55° to 65° as measured from the tangent line T which extends from the middle of the respective curved surface 572. Further, the tangent line T forms an angle in a range of preferably 25° to 35° to generally flat surface 573, more preferably, 28° to 32° to surface 573, and most preferably approximately 30° to surface 573.

Figure 31:
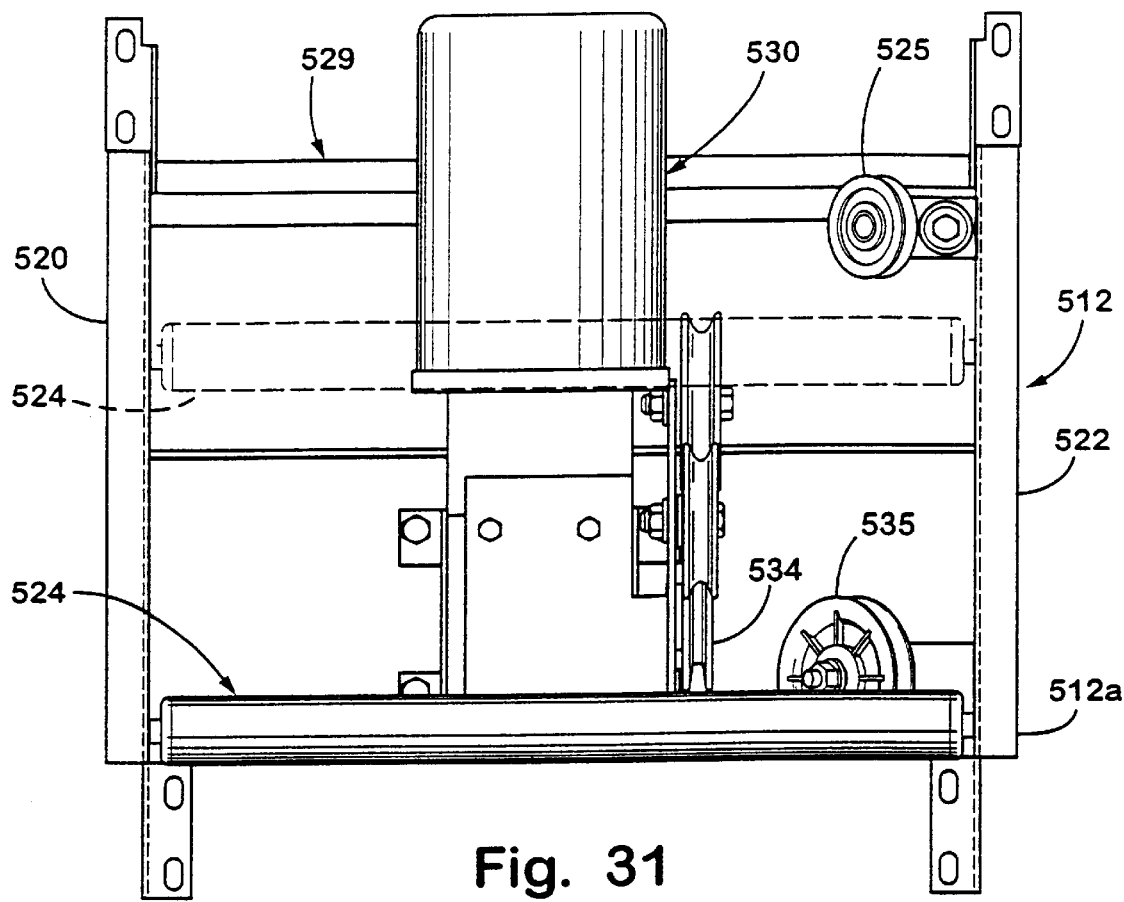
FIG. 31 is a plan view of a second embodiment of the driver section of the present invention.
Figure 32:
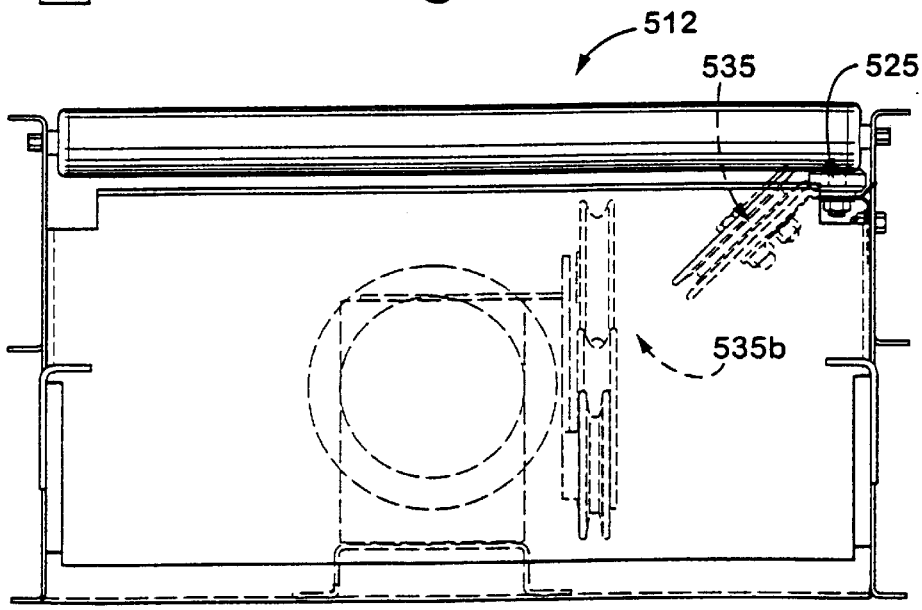
FIG. 32 is an end elevation view of an input end of the driver section of FIG. 31.

Referring to FIGS. 25 and 31, driver section 512 includes a pair of opposed frame members 520 and 522 which respectively support a plurality of rollers 524 (only one shown in solid and one shown in phantom for clarity in FIG. 31). Driver section 512 further includes a motor 530 and drive pulley or sheave 534, which are mounted between frame members 520 and 522 by a cross-brace member 529. Driver section 512 also includes a compound angle return pulley 535, a return pulley 536, and two redirection sheaves or pulleys 535a and 535b. Positioned at output or discharge end 512b of driver section 512 is a spring pulley assembly 525 for directing belt 552 from the spring pulley assemblies 554 of curved conveyor section 514 to compound angle return pulley 535. Compound angle return pulley 535 directs belt 552 to return pulley 536, which in turn directs belt to redirection pulley 535b. Redirection pulleys 535b in turn directs belt 552 to drive pulley 534, which directs belt 552 to redirection pulley 572.

Figure 30:
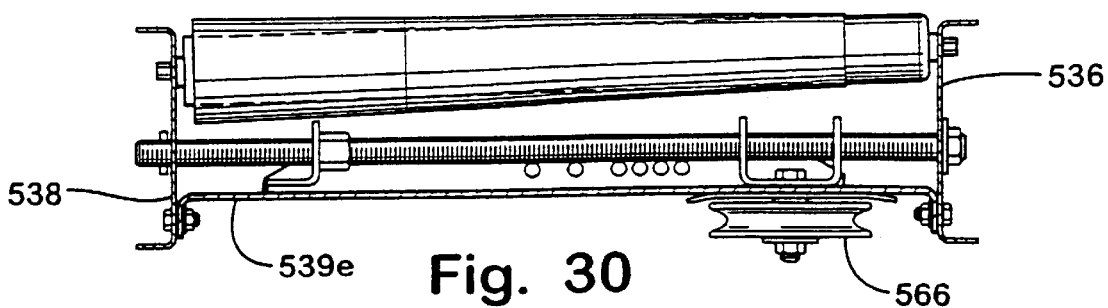
FIG. 30 is a cross-sectional view taken along line XXX—XXX of FIG. 25.

Referring to FIGS. 25 and 30, tensioner assembly 560 includes a pair of spaced apart redirection pulleys 562 and 564 and an adjustable pulley 566, which is mounted between redirection pulleys 562 and 564 on transverse brace member 539e, which extends between side frame members 536 and 538. Pulley 566 is movable along brace member 539e and provides adjustment for the belt tension, as would be understood by those skilled in the art. Tensioner assembly 560 is of conventional design and, therefore, further details of tensioner assembly 560 are omitted herein. Optionally positioned between tensioner assembly 560 and return pulley 556 is another redirection pulley 558, which reorients and redirects belt 552 from tensioner assembly 560 to return pulley 556. In addition, optionally positioned between tensioner assembly 560 and redirection pulley 572 is a yet another redirection pulley 570. Additional redirection pulleys may be used between return pulley 556 and tensioner assembly 560 and between redirection pulley 572 and tensioner assembly 560 depending on the length of the curved conveyor section and the distances between the respective support assemblies, as would be understood by those skilled in the art.

Spring pulley assemblies 554 are of similar construction to spring pulley assembly 54 and include a groove pulley 554a and an optional lateral restraint 554b, which are commonly supported on and mounted to side frame member 536 by a spring mounting bracket 554c. Bracket 554c mounts the respective pulley spring assemblies at an angle offset from the rollers, as previously described, in order to orient and align the driving surface of belt 552 with rollers 540 and 540'. As noted in reference to the previous embodiments, the driving surface of belt 552 is offset from the belt's axis of symmetry. Lateral restraint 554b restrains belt 552 from lifting out of groove pulley 554a and preferably comprises a bearing or wheel, for example a plastic bearing, as previously described in reference to spring pulley assemblies 54.

It should be understood, that curved conveyor section 514 may also be used in conjunction with a junction conveyor section similar to junction conveyor section 16. In this manner, return pulley 556 may be mounted to a junction conveyor section in lieu of the slave drive assembly 114 described in reference to junction conveyor section 16. When return pulley 556 is moved to the end of a junction conveyor section, it should be understood that additional redirection pulleys, similar to redirection pulley 558 may be used to properly support and orient belt 552. While in the illustrated embodiment curved and junction conveyor sections comprise 90° angle conveyor sections, it should be understood that conveyor sections 514 and 16 may comprise 30°, 45°, or 60° angle curved and junction conveyors. Moreover, curved and junction conveyor sections 514 and 16 may be combined with other curved conveyor sections, junction assemblies or drivers to achieve a plurality of desired configurations.

While several forms of the invention have been shown and described, other forms will now be apparent to those skilled in the art. For example, other drive arrangements may be used to drive the belts preferably in a manner that maintains the orientation of the belt to minimize twisting. In addition, as mentioned in reference to the first embodiment, the conveyor sections may have other frame configurations. Furthermore, on the straight runs of the junction conveyor section one or more lateral restraints may be omitted from the spring pulley assemblies. Moreover, the general mounting details and configurations may be varied as desired without departing from the scope of the invention. The embodiments of the invention shown in the drawings are not intended to limit the scope of the invention which is defined by the claims which follow.

We claim:

1. A conveyor comprising:
   a plurality of rollers, each of said rollers rotating about a roller axis;
   a driver belt;
   at least one support pulley supporting said driver belt and rotating about an axis non-parallel with said roller axes; and
   a restraint for said belt at said at least one support pulley, and said driver belt and said at least one support pulley have a non-circular interface.

2. The conveyor according to claim 1, wherein said restraint comprises a rotating member and said rotating member rotates when said belt passes over said support pulley.

3. The conveyor according to claim 1, wherein said restraint comprises a wheel for restraining said belt in said at least one support pulley.

4. The conveyor according to claim 1, wherein said restraint comprises a low friction surface.

5. The conveyor according to claim 1, wherein said driver belt includes a planar portion, said at least one support pulley engaging said planar portion to provide said non-circular interface.

6. The conveyor according to claim 1, wherein said support pulley orients said driver belt along a driver axis, said driver axis forming an angle in a range of about 20 to 60 degrees with respect to said roller axes.

7. A belt drive system for driving at least some of the rollers of a roller conveyor, the roller conveyor having a plurality of rollers, said belt drive system comprising:
   a closed loop belt having a non-circular base and a substantially continuous driving surface; and
   a plurality of pulleys supporting said belt, said pulleys being constructed and arranged to position and maintain said belt in an orientation in said pulleys, a first group of said pulleys for positioning said belt for contacting at least some of the rollers with said driving surface, wherein said base comprises a generally V-shaped base, each of said pulleys including a groove commensurate in size with said V-shaped base, said belt being positioned in said grooves and thus being laterally supported by said pulleys, said belt having an axis of symmetry, and said continuous driving surface being offset from said axis of symmetry at an angle in a range from 55° to 65°.

8. A belt drive system for driving at least some of the rollers of a roller conveyor, the roller conveyor having a plurality of rollers, said belt drive system comprising:
   a closed loop belt having a non-circular base and a substantially continuous driving surface; and
   a plurality of pulleys supporting said belt, said pulleys being constructed and arranged to position and maintain said belt in an orientation in said pulleys, a first group of said pulleys for positioning said belt for contacting at least some of the rollers with said driving surface, said belt comprising a link belt, and said link belt being formed from a plurality of interlocking links.

9. A conveyor comprising:
   a plurality of rollers, each of said rollers rotating about a roller axis;
   a driver belt;
   at least one support pulley supporting said driver belt and rotating about an axis non-parallel with said roller axes; and
   a restraint for said belt at said at least one support pulley, said restraint comprising a rotating member, said rotating member rotating when said belt passes over said support pulley, said rotating member rotates about a restraint axis, and said restraint axis being generally orthogonal to said roller axis.

10. A conveyor comprising:
    a plurality of rollers, each of said rollers rotating about a roller axis;
    a driver belt;
    at least one support pulley supporting said driver belt and rotating about an axis non-parallel with said roller axes; and
    a restraint for said belt at said at least one support pulley, and said restraint comprising a bearing for restraining said belt in said at least one support pulley.

11. A belt drive system for driving at least some of the rollers of a roller conveyor, the roller conveyor having a plurality of rollers, said roller conveyor belt drive system comprising:
    a closed loop belt having a non-circular base and a substantially continuous driving surface; and
    a plurality of pulleys supporting said belt, said pulleys being constructed and arranged to position and maintain said belt in an orientation in said pulleys, a first group of said pulleys for positioning said belt for contacting at least some of the rollers with said driving surface, at least one of said first group of pulleys including a lateral restraint for maintaining said belt in said orientation in said at least one pulley, said lateral restraint comprising a bearing, and said bearing being supported with and positioned adjacent said at least one pulley and contacting a portion of said driving portion of said belt.

12. The belt drive system according to claim 11, wherein one of said pulleys comprise a tensioner pulley, said tensioner pulley maintaining a tension on said belt.

13. The belt drive system according to claim 11, wherein one of said pulleys comprise a slave pulley, said slave pulley being adapted for driving an adjacent roller conveyor.

14. The belt drive system according to claim 11, further comprising a plurality of said lateral restraints, each of said lateral restraints being associated with a respective pulley of said first group of pulleys for urging said belt to remain engaged with said respective pulleys.

15. The belt drive system according to claim 11, wherein said base comprises a generally V-shaped base, each of said pulleys including a groove commensurate in size with said V-shaped base, and said belt being positioned in said grooves and thus being laterally supported by said pulleys.

16. A conveyor comprising:

a support frame;

a plurality of rollers rotatably supported by said support frame;

a belt drive system, said belt drive system including a closed loop belt and a plurality of pulleys for supporting and guiding said belt around a closed path on said conveyor, said belt including a substantially continuous driving surface for driving said rollers; and a first group of said plurality of pulleys comprises support pulleys, and said support pulleys being angled in a non-orthogonal orientation to said rollers for orienting said belt to engage said rollers with said continuous driving surface.

17. The conveyor according to claim 16, wherein each of said support pulleys are mounted to said frame by spring mounting members thereby minimizing pressure from said belt on said rollers and reducing the wear and tear on said belt, pulleys, and rollers.

18. The conveyor according to claim 16, wherein one of said plurality of pulleys comprises a tensioner pulley, said tensioner pulley tensioning said belt.

19. The conveyor according to claim 16, wherein said support pulleys are adapted to restrain lateral movement of said belt.

20. The conveyor according to claim 16, further comprising a lateral restraint associated with each of said support pulleys, said lateral restraints at least limiting lateral movement of said belt in said support pulleys.

21. The conveyor according to claim 16, wherein said support frame includes an inner radius frame member and an outer radius frame member forming a curved conveyor section, a first group of said rollers comprising tapered rollers having smaller diameters at said inner radius frame than at said outer radius frame member, and said belt being positioned adjacent said inner radius frame member for engaging said diameters of said tapered rollers.

22. The conveyor according to claim 16, wherein two of said pulleys comprise return pulleys, said return pulleys being positioned and supported to maintain the orientation of said belt to prevent twisting of said belt.

23. The conveyor according to claim 22, wherein said support frame includes an input end, a discharge end, one of said return pulleys being positioned at said input end, and another of said return pulleys being positioned at said discharge end.

24. The conveyor according to claim 22, at least one of said plurality of pulleys comprises a slave drive pulley, said slave drive pulley being oriented in a generally vertical direction and being constructed and arranged for driving an adjacent conveyor section.

25. The conveyor according to claim 24, wherein support frame includes an input end and a discharge end, said slave drive pulley being positioned at said discharge end and receiving said belt from said return pulley.

26. The conveyor according to claim 25, wherein one of said return pulleys is located at said discharge end, and one of said plurality of pulleys comprises a compound pulley, said compound pulley directing said belt between said return pulley and said slave drive pulley.

* * * * *

UNITED STATES PATENT AND TRADEMARK OFFICE
CERTIFICATE OF CORRECTION

PATENT NO. : 6,651,808 B2 Page 1 of 1
APPLICATION NO. : 10/150047
DATED : November 25, 2003
INVENTOR(S) : Thanh V. Nguyen and Dennis J. Schuitema It is certified that error appears in the above-identified patent and that said Letters Patent is hereby corrected as shown below:

Column 14:
Line 10, Claim 21, Insert --smaller-- after "said" in the first occurrence.

Signed and Sealed this

Eighteenth Day of July, 2006

JON W. DUDAS
*Director of the United States Patent and Trademark Office*